3,844,990
AQUEOUS PAINT COMPOSITIONS OF VINYL ACETATE-ETHYLENE COPOLYMER LATICES
Martin K. Lindemann, Somerville, and Rocco P. Volpe, Newark, N.J., assignors to Air Products and Chemicals, Inc., Allentown, Pa.
No Drawing. Continuation-in-part of abandoned application Ser. No. 444,412, Mar. 31, 1965. This application Oct. 27, 1966, Ser. No. 589,830
Int. Cl. C08f 45/14; C09d 5/02
U.S. Cl. 260—17 R          1 Claim

ABSTRACT OF THE DISCLOSURE

This invention relates to aqueous paint compositions comprised of a vinyl acetate-ethylene copolymer latex with a cellulosic thickener. These paints are useful for the coating of interior and exterior surfaces.

CROSS-REFERENCED TO RELATED APPLICATIONS

This application is a continuation-in-part of our now abandoned application Ser. No. 444,412 filed Mar. 31, 1965.

Water-base paints, containing a synthetic polymer or copolymer as the film-forming ingredient, are, of course, well known and have been on the commercial market for many years. Generally, however, these paints are supplied either for interior use or for exterior use. The two uses have different requirements, and economic factors also enter into the picture. Exterior paints have the more rigorous requirements since they are normally exposed to much more severe conditions after they have been applied, particularly temperature conditions. For example, in many areas of the country where such paints are used, summer temperatures above 90° F. are commonly experienced, and in the same areas winter temperatures frequently fall to 0° F. or below. As a result, the paint film, to be satisfactory, must not soften so as to become tacky at the high temperatures experienced during the summer months, and it must not become brittle and crack at the low winter temperatures. If the paint film softens during the summer, dirt and other foreign matter adheres to it, and cleaning the paint film becomes very difficult or, in most cases, impossible, particularly after the film has hardened when the temperature has fallen. The need to avoid cracking of the film is obvious, since a cracked film no longer provides continuous protection for the coated surface. This combination of requirements has not been heretofore successfully met by a water base paint which can be applied directly to a raw wood surface, i.e. to the surface of wood which has not previously been painted or otherwise coated. Some success has been achieved by using these water-base paints over wood surfaces which have first been primed by a coating of another composition, generally an oil-base coating composition, or a special water-base composition. The foregoing requirements for an exterior paint have been met in the manner discussed above by means of compositions which are relatively expensive to produce. As a result, they are generally not sold for interior use because they cannot compete commercially with other compositions sold for this purpose. Since interior paint requirements are much less rigid than those for exterior paints, water base paints for interior use can be manufactured from much less expensive ingredients and much more economically. Consequently, for a purely economic point of view, these less expensive paints, which are adequate for interior use but which are wholly inadequate for exterior use, dominate the interior paint market.

There is, therefore, an important need for a water-base paint which can be manufactured relatively inexpensively so that it can compete with interior paints now available, but which can also be used on exterior surfaces. Furthermore, there is an important need for a paint for exterior use which can be successfully applied to raw wood without requiring an underlying priming coat.

It is an object of the present invention to provide a water-base paint which meets the standards for exterior use, and can be applied directly over raw wood.

It is a further object of the invention to provide a paint of the character indicated, which can also be used for interior coating purposes.

It is another object of the invention to provide a water-base paint which can be used both for exterior and interior purposes, not only from the standpoint of performance but from the standpoint of economics.

In accordance with the present invention, there is provided a water-base paint containing appropriate pigments and comprising a synthetic copolymer latex in which the film-forming ingredient is a vinyl acetatae-ethylene copolymer having a relatively high ethylene content in the copolymer molecule. The paint may also contain appropriate quantities of stabilizers, suspending agents and the like. Thus, the individual components of the water-base paint of the invention, other than the synthetic copolymer latex, are well known materials and articles of commerce used in water-base paints. The use of these materials in a latex of the character described below, however, provides a water base paint composition having the desirable characteristics and advantages referred to above.

The vinyl acetate-ethylene copolymer latices which are used in accordance with this invention have, as produced, a relatively high solids contents, e.g. solids content of 45 to 60%. They can, of course, be easily thinned by the addition of water to lower solids contents of any desired value. Similarly the copolymers can have, and preferably do have, a relatively high ethylene content, e.g. above 15%, although lower amounts can also be present. In general, the copolymers have an ethylene content of 5 to 40%. The latices also contain relatively high molecular weight vinyl acetate-ethylene copolymers. Typically the copolymers in the latices used in accordance with this invention have intrinsic viscosity values of 1 to 2.5 deciliters/g. as measured in benzene at 30° C., which is indicative of relatively high molecular weights. In addition, the latices have an average particle size of $0.1\mu$ to $2\mu$, preferably $0.15\mu$ to $1.5\mu$.

To produce the vinyl acetate-ethylene copolymer latices for preparing the paint compositions of the invention, vinyl acetate and ethylene are copolymerized in an aqueous medium under pressures not exceeding 100 atmospheres in the presence of a catalyst and at least one emulsifying agent, the aqueous system being maintained by a suitable buffering agent, at a pH of 2 to 6, and the catalyst is added incrementally. The process is a batch process which involves first a homogenization period in which the vinyl acetate suspended in water is thoroughly agitated in the presence of ethylene under the working pressure to effect solution of the ethylene in the vinyl acetate up to the substantial limit of its solubility under the conditions existing in the reaction zone, while the vinyl acetate is gradually heated to polymerization temperature. The homogenization period is followed by a polymerization period during which the catalyst, which consists of a main catalyst or initiator, and may include an activator, is added incrementally, the pressure in the system being maintained substantially constant by application of a constant ethylene pressure.

Various free-radical forming catalysts can be used in carrying out the polymerization of the monometers, such as peroxide compounds. Also suitable are the combination type catalysts employing both reducing agents and oxidizing agents. The use of this type of combined catalyst is generally referred to in the art as "redox polymerization" or "redox system." The reducing agent is often referred to as an activator and the oxidizing agent as an initiator. Suitable reducing agents or activators include bisulfites, sulfoxylates, or other compounds having reducing properties such as ferrous salts, and tertiary aromatic amines, e.g. N,N-dimethyl anilines. The oxidizing agents or initiators include hydrogen peroxide, organic peroxides such as benzoyl peroxide, t-butyl hydroperoxide and the like, persulfates, such as ammonium or potassium persulfate, perborates, and the like. Specific combination type catalysts or redox systems which can be used include hydrogen peroxide and zinc formaldehyde sulfoxylate; hydrogen peroxide, ammonium persulfate, or potassium persulfate, with sodium metabisulfite, sodium bisulfite, ferrous sulfate, dimethylaniline, zinc formaldehyde sulfoxylate or sodium formaldehyde sulfoxylate. It is advantageous to utilize the more water-soluble peroxides, such as hydrogen peroxide, rather than the more oil-soluble peroxides such as t-butyl hydroperoxide, in the redox system, to catalyze the monomer polymerization of this invention. Redox catalyst systems are described, for example, in "Fundamental Principles of Polymerization" by G. F. D'Alelio (John Wiley and Sons, Inc., New York, 1952) pp. 333 et seq. Other types of catalysts that are well-known in the art can also be used to polymerize the monomers with or without the addition of reducing agents or other activating materials.

The catalyst is employed in the amount of 0.1 to 2%, preferably 0.25 to 0.75%, based on the weight of vinyl acetate introduced into the system. The activator is ordinarily added in aqueous solution and the amount of activator is generally 0.25 to 1 times the amount of catalyst.

The emulsifying agents which are suitably used are non-ionic. Suitable non-ionic emulsifying agents include polyoxyethylene condensates. Polyoxyethylene condensates may be represented by the general formula:

$$R\text{-}(CH_2\text{---}CH_2\text{---}O)_nH$$

where R is the residue of a fatty alcohol containing 10–18 carbon atoms, an alkyl phenol, a fatty acid containing 10–18 carbon atoms, an amide, an amine, or a mercaptan, and where $n$ is an integer of 1 or above. Some specific examples of polyoxyethylene condensates which can be used include polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thio-ethers such as polyoxyethylene n-dodecyl thio-ether.

The non-ionic emulsifying agents which can be used according to this invention also include a series of surface active agents known as "Pluronics." The "Pluronics" have the general formula:

$$HO(C_2H_4O)_a(C_3H_6O)_b(C_2H_4O)_cH$$

where $a$, $b$, and $c$ are integers of 1 or above. As $b$ increases, the compounds become less water soluble or more oil soluble and thus more hydrophobic when $a$ and $c$ remain substantially constant.

In addition, highly suitable are a series of ethylene oxide adducts of acetylene glycols sold comercially under the name "Surfynols." This class of compounds can be represented by the formula

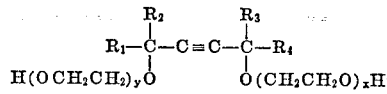

in which $R_1$ and $R_4$ are alkyl radicals containing from 3 to 10 carbon atoms, $R_2$ and $R_3$ are selected from the group consisting of methyl and ethyl, $x$ and $y$ have a sum in the range of 3 to 60, inclusive.

Some examples of non-ionic emulsifying agents which can be used are as follows:

A polyoxyethylene nonylphenyl ether having a cloud point of between 126 and 133° F. is marketed under the trade name "Igepal CO–630" and a polyoxyethylene nonylphenyl ether having a cloud point above 212° F. is marketed under the trade name "Igepal CO–887." A similar polyoxyethylene nonylphenyl ether having a cloud point of about 86° F. is marketed under the trade name "Igepal CO–610." A polyoxyethylene octylphenyl ether having a cloud point of between 80° F. and 160° F. is marketed under the trade name "Triton X–100".

A polyoxyethylene oleyl ether having a cloud point of between 90° F. and 160° F. is marketed under the trade name "Atlas G–3915" and a polyoxyethylene lauryl ether having a cloud point above 190° F. is marketed under the trade name "Brij 35."

A polyoxypropylene having a cloud point of about 140° F. is marketed under the trade name "Pluronic L–64," and a polyoxypropylene having a cloud point of about 212° F. is marketed under the trade name "Pluronic F–68." "Pluronic L–64" is a polyoxyethylene-polyoxypropylene glycol conforming to the above general formula for "Pluronics" in which the polyoxypropylene chain has a molecular weight of 1500 to 1800 and the polyoxyethylene content is from 40 to 50 percent of the total weight of the molecule. "Pluronic F–68" is a polyoxyethylene-polyoxypropylene glycol conforming to the above general formula for "Pluronics" in which the polyoxypropylene chain has a molecular weight of 1500 to 1800 and the polyoxyethylene content is from 80 to 90 percent of the total weight of the molecule. The polyoxypropylene "Pluronics" are obtained by condensing ethylene oxide on the polyoxypropylene base and the hydrophobic-hydrophilic nature of the resulting compound is controlled by varying the molecular weight of either the hydrophobic base or the hydrophilic portion of the molecule.

Representative of the "Surfynols" are "Surfynol 465" which is an ethylene oxide adduct of 2,4,7,9-tetramethyl decynediol containing an average of 10 moles of ethylene oxide per mole, and "Surfynol 485" which corresponds to "Surfynol 465" but contains an average of 30 moles of ethylene oxide per mole. "Surfynol 465" has a cloud point of about 145° F. and "Surfynol 485" has a cloud point above 212° F.

In the foregoing, cloud points recited are based on 1% aqueous solutions. A single emulsifying agent can be used, or the emulsifying agents can be used in combination. When combinations of emulsifying agents are used, it is advantageous to use a relatively hydrophobic emulsifying agent in combination with a relatively hydrophilic agent. A relatively hydrophobic agent is one having a cloud point in 1% aqueous solution below 190° F. and a relatively hydrophilic agent is one having a cloud point in 1% aqueous solution of 190° F. or above.

The concentration range of the total amount of emulsifying agents useful is from 0.5 to 5% based on the aqueous phase of the latex regardless of the solids content. Latex stabilizers are also advantageously used. The stabilizers employed are, in part, governed by the intended particle size of the copolymer. For example, the vinyl acetate-ethylene copolymer latices prepared by the above-described method can have various average particle size ranges, as indicated. When the latices are to have a very small average particle size, e.g., below 0.25µ, an ethylenically-unsaturated acid having up to 6 carbon atoms, is advantageously used as the stabilizer. Typical acids of this character are acrylic acid, methacrylic acid, itaconic acid, maleic acid, vinyl sulfonic acid and the like. These unsaturated acids impart increased stability to the latices. They tend to copolymerize with the monomers in the system. The amount of unsaturated acid used is suitably 0.1 to 3% based on vinyl acetate, preferably 0.2 to 1%.

On the other hand, when the latex is to have an average particle size above 0.25µ, a protective colloid can be used in the polymerization mixture as the stabilizing agent although an unsaturated acid can be used if desired. Various amounts of colloids can be incorporated into the latices as desired, but it is preferred to maintain the colloid concentration at the lowest level possible to insure a coating with good water- and scrub-resistance and yet obtain the desired viscosity. The amount of colloid used will also depend upon the particular colloid employed. Colloids of higher molecular weight tend to produce a latex of a higher viscosity than like amounts of a lower molecular weight colloid. Other properties of the colloids aside from their molecular weight also affect the viscosity of the latices and also the properties of the films formed therefrom. It is advantageous to maintain the colloid content of the latices between about 0.05 and 2% by weight based on the total latex, and hydroxyethyl cellulose is a particularly advantageous colloid when used in the latices, imparting unusually good properties to the polymer latices and to the coatings formed therefrom.

Various other colloids can also be used with the latices of this invention including polyvinyl alcohol, partially-acetylated polyvinyl alcohol, e.g., up to 50% acetylated, casein, hydroxyethyl starch, carboxymethyl cellulose, gum arabic, and the like, as known in the art of synthetic polymer latex technology.

In order to maintain the pH of the system at the desired value, there is suitably added an alkaline buffering agent of any convenient type. Any alkaline material which is compatible with the stabilizing agent can be used as the buffer. The amount of buffer is that sufficient to adjust the pH of the system within the desired range. Ammonium and sodium bicarbonate are preferred buffer because of their compatibility with the system and their low cost. The amount of buffer is generally about 0.1 to 0.5% by weight, based on the monomers. Other buffers such as disodium phosphate, sodium acetate, and the like, can, however, also be used.

As previously indicated latices of relatively high solids contents can be directly produced by the described process. Lower reaction temperatures for polymerizing vinyl acetate than have heretofore been feasible economically can be used in the process. The use of lower reaction temperatures has been found to result in higher molecular weight vinyl acetate-ethylene copolymers. The reaction temperature can be controlled by the rate of catalyst addition and by the rate of the heat dissipation therefrom. Generally, it is advantageous to maintain a mean temperature of about 50° C. during the polymerization of the monomers and to avoid temperatures much in excess of 80° C. While temperatures as low as 0° can be used, economically the lower temperature limit is about 30° C.

The reaction time will also vary depending upon other variables such as the temperature, the catalyst, and the desired extent of the polymerization. It is generally desirable to continue the reaction until less than 0.5% of the vinyl acetate remains unreacted. Under these circumstances, a reaction time of about 6 hours has been found to be generally sufficient for complete polymerization, but reaction times ranging from 3 to 10 hours have been used, and other reaction times can be employed, if desired.

In carrying out the polymerization, a substantial amount of the vinyl acetate is initially charged to the polymerization vessel and saturated with ethylene in the manner discussed above. Most advantageously, at least about 75% of the total vinyl acetate to be polymerized is initially charged, preferably at least about 85%, and the remainder of the vinyl acetate is incrementally added during the course of the polymerization. All of the vinyl acetate can also be charged initially, with no additional incremental supply. When reference is made to incremental addition, whether of vinyl acetate, catalyst, or activator, substantially uniform additions, both with respect to quantity and time, are contemplated.

The quantity of ethylene entering into the copolymer is influenced by the pressure, the agitation, and the viscosity of the polymerization medium. Thus, to increase the ethylene content of the copolymer, higher pressures are employed, but even to introduce 40% or more of ethylene into the copolymer, pressures in excess of 100 atms. are not required. However, a pressure of at least about 10 atms. is most suitably employed. Similarly, when high ethylene contents are desired, a high degree of agitation should be employed, and high viscosities should be avoided, a low viscosity being preferred. When referring to viscosities, a viscosity of 30 to 150 centipoises is considered a low viscosity, a viscosity of 151 to 800 centipoises is considered a medium viscosity, and a viscosity of 801 to 3000 centipoises is considered a high viscosity.

The process of forming the vinyl acetate-ethylene copolymer latices generally comprises the preparation of an aqueous solution containing at least some of the emulsifying agent and stabilizer, and the pH buffering system. This aqueous solution and the initial charge of vinyl acetate are added to the polymerization vessel and ethylene pressure is applied to the desired value. As previously mentioned, the mixture is thoroughly agitated to dissolve ethylene in the vinyl acetate and in the water phase, agitation being continued until substantial equilibrium is achieved. This generally requires about 15 minutes. However, less time may be required depending upon the vessel, the efficiency of agitation, the specific system, and the like. In any case, by measuring the pressure drop of the ethylene in conventional manner, the realization of substantial equilibrium can be easily determined. Conveniently the charge is brought to polymerization temperature during this agitation period. Agitation can be effected by shaking, by means of an agitator, or other known mechanism. The polymerization is then initiated by introducing initial amounts of the catalyst, and of the activator when used. After polymerization has started, the catalyst and the activator are incrementally added as required to continue polymerization, and the remaining vinyl acetate, if any, is similarly added.

As mentioned, the reaction is generally continued until the residual vinyl acetate content is below 0.5%. The completed reaction product is then allowed to cool to about room temperature, while sealed from the atmosphere. The pH is then suitably adjusted to a value in the range of 4.5 to 7, preferably 6 to 6.5 to insure maximum stability.

The particle size of the latex can be regulated by the quantity of non-ionic emulsifying agent or agents employed and by the use or nonuse of a colloidal stabilizing agent. Thus, to obtain smaller particle sizes, greater amounts of emulsifying agent are used and colloidal stabilizing agents are not employed. For example, to provide average particle sizes below about 0.25µ, the total amount of non-ionic emulsifying agent should be at least about 2%, based on the aqueous phase of the latex, and no colloidal stabilizing agent should be used, or if a colloidal stabilizing agent is used, only very small amounts should be employed.

On the other hand, when particle sizes of 0.25µ and above are desired, at most about 2% of total emulsifying agent based on the aqueous phase of the latex should be used, and a colloidal stabilizing agent should be included in the amounts previously indicated. As a general rule, the smaller the amount of emulsifying agent employed and the greater the amount of colloidal stabilizing agent included in the latex system, the greater the average particle size. Conversely, the greater the amount of the emulsifying agent employed and the smaller the amount of colloidal stabilizing agent used, including the total absence of the latter, the smaller the average particle size. It will be understood that in each case, the quantity and size values referred to above are all within the ranges of values previously specified in the foregoing description.

The paint can be prepared from the latex by conventional techniques used in the preparation of paints from synthetic polymer latices. However, there is a preferred method which has been found to give the desired paint with ease and with minimum time. In the preferred method of preparation of the paint, the pigment is blended in a mixer with dispersing agents which may comprise a water-soluble non-ionic surface-active agent, a water-soluble anionic pigment dispersant or surface-active agent, and a water-soluble thickener. If desired, the thickener can be omitted from the paste and added during let down.

The above-mentioned ingredients are generally mixed to form a heavy paste for a minimum time of twenty minutes. At this point an antifoam agent, such as tributyl phosphate may be added, if desired.

The paste is then reduced or let down with the latex. Ordinarily, a coalescing solvent is added at this point during the let down in the making of conventional water-base latex paints to improve fusion of the particles into a continuous film, and is advantageously used in making the paint of this invention. For example, diethylene glycol monoethyl ether acetate or the like is suitable as a coalescing solvent.

In general, it is desired that the pH of the completed latex paint be between about 7 and about 10 and preferably between about 7.5 and about 9.

In conventional latex paint formulation it is common practice to add a soluble, hard resinous anti-blocking agent. Conventional latex polymers are thermoplastic in nature. Unless heat or solvents can be used to aid particle coalescence, the polymer particles must be made sufficiently soft to permit coalescence. As a result, the conventional film is inherently lacking in hardness and it is necessary to include in the latex paint a hard, resinous anti-blocking agent which is soluble in the aqueous medium. The anti-blocking agent is one which, upon evaporation of the aqueous medium produces a resin having a softening point significantly higher than that of the resin of which the latex particles are composed. Rosin derivatives such as prepared by esterification or hydrogenation are typical hard resinous anti-blocking agents.

The anti-blocking agent increases the resistance to blocking or sticking between painted surfaces under elevated temperature or high pressure. It is believed that the anti-blocking agent forms a film around the coalescing particles of the polymer of the latex as the paint film is being formed. As the aqueous medium evaporates, the anti-blocking agent hardens, reducing the effect of the thermoplastic latex particles on film hardness. It is a further feature of the present invention that no anti-blocking agent is needed. The film deposited from the latex is itself sufficiently anti-blocking.

The reduction or let down mixture contains some or all of the thickener. Other ingredients, such as fungicides may also be included in the let down or may be previously added. Phenyl mercuric acetate is a suitable fungicide.

Among the suitable pigments which may be used in accordance with this invention are the finely-divided rutile titanium dioxides. Pigments other than rutile titanium dioxide can, however, also be used.

Examples of pigments which may be employed for producing paints in accordance with this invention are titanium dioxide such as that known as "Titanox RA-50"; lithopone such as that known as "Albalith 14"; antimony oxide; barytes; diatomaceous silica, e.g. "Celite 281"; talc such as "Nytal 300"; clay such as that sold under the name "ASP 400"; mica, for example 325 mesh waterground mica; red, yellow, black and brown iron oxides, e.g. "Irox Red 1380" and "Mapico Brown"; maroon oxides; cadmium red; toluidine red; para red; lithol toner; cadmium yellow; hansa yellow; benzidine yellow; dinitraniline orange; chromium oxide green; phthalocyanine green; phthalocyanine blue; lamp-black; carbon black; mineral black; and luminous pigments.

The pigment particles should not have a diameter in excess of about $50\mu$, but particle sizes even as little as $0.1\mu$ are suitable. The amount of pigment used can vary but generally 6 pounds per gallon of finished paint is a practical maximum.

Among the preferred water-soluble non-ionic surface active agents used in the preparation of the latex paint are those described above in connection with the preparation of the resin latex. The water-soluble non-ionic surface active agent, when used, is included in amounts between about 0.01 and about 1.5 weight percent, based on the total weight of the latex paint.

The thickener is preferably cellulosic, of which the following are satisfactory: methyl cellulose, hydroxyethyl cellulose and carboxy methyl cellulose. Other thickeners which may be used are polyvinyl alcohol, gum arabic, gum tragacanth, ammonium polyacrylate, sodium polyacrylate, ammonium alginate, sodium alginate. The thickener is generally included in amounts between about .1 and about 3 weight percent, based on the total weight of the latex paint.

The preferred anionic pigment dispersants are those composed of polymerized sodium salts of alkyl naphthalene sulfonic acid. Other anionic dispersants which may be used are a sodium salt of polymerized alkyl aryl sulfonic acid; a guanidine salt of monoethyl phenol; and a sodium salt of condensed sulfonic acid. Other typical anionic surfactants are disclosed, for example, in Chapter 2 of "Surface Active Agents and Detergents" by A. M. Schwartz, J. S. Perry and J. Berch (Vol. 2, 1958, Interscience Publishers, New York). When used, the anionic dispersant is included in amounts between about 0.01 and about 1.5 weight percent based on the total weight of the latex paint.

The relative proportions of the several components of the paint composition of this invention may vary to suit individual requirements, and in general, the composition has the following relative relationships, per 100 parts of copolymer resin, all parts being by weight:

|  | Parts |
|---|---|
| Vinyl acetate-ethylene copolymer latex (solids basis) | 100 |
| Pigment, e.g. titanium dioxide | 10 to 1000 |
| Dispersing agent(s) | .5 to 10 |
| Coalescing solvent | 0 to 10 |
| Water—sufficient to provide solids content of 40 to 60 percent. | |

It will, of course be understood that other conventional additives customary in the compounding of water-base latex paints can be included in the paint of this invention.

The invention will now more specifically illustrated by reference to the following examples of practical application, it being understood that these examples are given for illustrative purposes only and are not limitative of the invention.

EXAMPLE 1

The following was charged to a 25-gal. stainless steel pressure reactor equipped with temperature controls and an agitator:

|  | G. |
|---|---|
| Water | 20,000 |
| Igepal 887 | 680 |
| Igepal 630 | 340 |
| Sodium salt of vinyl sulfonic acid | 128 |
| Sodium lauryl sulfate | 38 |
| Citric acid | 56 |
| Disodium phosphate hydrate | 24 |
| Vinyl acetate | 22,600 |

The reactor was then purged with nitrogen and ethylene to remove all oxygen, after which 300 g. of potassium persulfate were added. The charge was heated to 50° C. During the heat-up period ethylene was added to a pressure of 36 atm. and the agitator set at 230 r.p.m. The equilibrium of ethylene between the vapor pocket and dissolved in the vinyl acetate was reached within 15 min. as indicated by the stoppage of ethylene flow from the supply cylinder to the reactor. Polymerization was then started by adding 25 g. of 4% Formopon (sodium formaldehyde sulfoxylate) solution. The polymerization was completed after 4½ hr. at which time 1,500 g. of 4% Formopon solution had been used and an additional 10 g. potassium persulfate had been added. The latex was cooled to room temperature and neutralized to pH=6 with ammonia. A vinyl acetate-ethylene copolymer latex was obtained with the following properties:

48% solids
19% ethylene in copolymer
Intrinsic viscosity=2.1 (100 ml./g., benzene, 30° C.)
Particle size=0.21μ
$T_{135}$=0° C.
$T_4$=+6° C.

($T_{135}$ is the temperature at which the torsional modulus is 135,000 lbs./in.$^2$, and $T_4$ the temperature at which the torsional modulus is 10,000 lbs./in.$^2$ determined according to ASTM-D1043-61T).

The ethylene content is suitably determined by means of the saponification number, in conventional manner.

Intrinsic viscosity is similarly determined by contention techniques, e.g. in accordance with the procedure described on pages 309–314 of "Principles of Polymer Chemistry" by Paul J. Flory (Cornell University Press—1963), using an Ubbelohde (suspended level) Viscometer at 30° C. The determination is made in various solvents such as benzene, acetone, methyl ethyl ketone, and the like. The particle size indicated above is the average particle size, as used throughout this specification.

EXAMPLE 2

To the reactor of Example 1 there were charged 14,500 g. water, 17,000 g. vinyl acetate, 157 g. Cellosize QP-300, 218 g. Igepal 887, 151 g. Igepal 630, and 9 g. acettic acid. After purging the reactor with nitrogen and ethylene, 20 g. of potassium persulfate was added as a 4% solution. During the heat-up period to 50° C. ethylene was introduced to a pressure of 36 atm. and the agitator was set at 270 r.p.m. Equilibrium between ethylene in the vapor pocket and in the liquid phase was reached in about 15 minutes after which the polymerization was started by adding Formopon solution continuously. Potassium persulfate was aded incrementally as needed. The polymerization was completed in 10½ hrs.

The resulting latex had the following properties:

Solids—53%
Ethylene content in copolymer—18%
Viscosity—710 cps.
Intrinsic viscosity=2.85 (Benzene, 30% C.)
Average particle size—1.3μ
$T_{135}$=−1° C.
$T_4$ = +8° C.

As will be seen from the foregoing examples, the unsaturated acid previously mentioned in the discussion of stabilizers can be employed not only in its free acid form but also in the form of a salt such as a sodium salt. Similarly, it will be seen that the specified stabilizing agents can be omitted, and this is particularly true if a small amount, e.g. up to 0.5% based on the latex, of an anionic surfactant is present, or if a colloid substance is formed in the course of the polymerization. The anionic surfactant can be of any known type, such as disclosed, for example, in Chapter 2 of "Surface Active Agents and Detergents" by A. M. Schwartz, J. S. Perry and J. Berch (Vol. 2, 1758, Interscience Publishers, New York). A particularly suitable anionic surfactant is sodium lauryl sulfate.

EXAMPLE 3

The following paint was prepared by adding the following materials in the quantities indicated to 182 parts of the latex of Example 2:

| | Parts |
|---|---|
| Cellosize QP-4400, 3% solution (Hydroxy ethyl cellulose) | 200 |
| Defoamer (Nopco NDW) | 2 |
| Tamol 731 (Sodium salt of carboxylated anionic surface-active agent) | 5 |
| Igepal CO-610 (Nonyl phenoxy polyoxyethylene ethanol) | 3 |
| Ethylene glycol | 18 |
| Ti-Pure R-610 (Titanium dioxide) | 150 |
| Lorite (Calcium carbonate/silicate) | 240 |
| Phenyl mercuric acetate (18% Hg content) | .3 |
| Carbitol acetate (Diethylene glycol monoethyl ether acetate) | 10 |
| Water | 292 |
| Latex (Example 2) | 182 |

Paint tests showed the paint to have excellent hiding power and scrubability.

EXAMPLE 4

Again using the latex of Example 2, the following paint formulation was compounded:

| | Parts |
|---|---|
| Cellosize QP-4400, 3% solution | 125 |
| Polyglycol P-1200 (polypropylene glycol) | 3 |
| R and R 551 (lecithin) | 5 |
| Surfynol TG (mixture of ditertiary acetylenic glycol and nonyl phenol ethylene oxide adduct) | 3 |
| Ethylene glycol | 20 |
| Nopco NDW (defoamer) | 2 |
| Ti-Pure 510 | 225 |
| Talc (Nytal 300) | 117 |
| Phenyl mercuric acetate (18% mercury) | 8 |
| Water | 169 |
| Carbitol (diethylene glycol monoethyl ether) | 16 |
| Latex (Example 2) | 418 |

Exposure results with this paint were excellent in comparison with a commercial vinyl acrylic, and with Rhoplex AC-34, an all acrylic paint.

EXAMPLE 5

The latex of Example 1 was compounded into a paint of the following formulation:

| | Parts |
|---|---|
| Cellosize QP-4400 (3% solution) | 190 |
| Tamol 731 | 5 |
| Igepal CO-610 | 1.5 |
| Nopco NDW | 3 |
| Ethylene glycol | 25 |
| Ti-Pure R-510 (titanium dioxide) | 120 |
| Zeolex 80 (hydrated sodium silica aluminate) | 40 |
| Witcarb R (precipitated calcium carbonate) | 100 |
| Talc (Asbestine 3X) | 150 |
| Phenyl mercuric acetate | 0.3 |
| Carbitol acetate | 8 |
| Water | 265 |
| Latex (Example 1) | 215 |

This paint had good washability, it showed excellent touchup, color uniformity and excellent fusion at 38° F. Clear films of this paint have better elongation than commercial vinyl acetate copolymers.

EXAMPLE 6

The following was charged to a 15-gal. stainless-steel pressure reactor equipped with temperature controls and an agitator:

| | |
|---|---:|
| Water _____ g__ | 11,340 |
| Igepal 887 _____ g__ | 324 |
| Igepal 630 _____ g__ | 228 |
| 2% Aqueous Solution Natrosol 250 GR (Hydroxy Ethyl Cellulose) _____ g__ | 5,450 |
| 1% Aqueous Ferrous Sulfate Solution _____cc__ | 50 |
| Vinyl acetate _____ g__ | 5,450 |

The pH of the foregoing mixture was adjusted with dilute HCl to 3.5. The reactor was then purged with nitrogen and ethylene to remove all oxygen, after which 100 cc. of a 10% Formopon solution was added. The charge was heated to 50° C. During the heat-up period ethylene was added to a pressure of 700 p.s.i.g., and the agitator was set at 150 r.p.m. The equilibrium of ethylene between the vapor pocket and dissolved in the vinyl acetate was reached within 15 minutes as indicated by the stoppage of ethylene flow from the supply cylinder to the reactor. Polymerization was then started by adding a small amount of a 2% aqueous solution of t-butylhydroperoxide and the addition of this catalyst was continued intermittently to maintain the reaction throughout the polymerization period, and additional quantities of Formopon were also added intermittently. During the first three hours of the reaction there was added, in substantially uniform increments, 12,500 g. of vinyl acetate. The polymerization was complete after 4½ hours at which time a total of 69 g. (dry basis) of t-butylhydroperoxide and 65 g. (dry basis) of Formopon had been added. The latex was cooled to room temperature and neutralized to pH=6 with ammonia. A vinyl acetate-ethylene copolymer latex was obtained which had the following properties:

51.2% solids
21% ethylene in copolymer
Intrinsic viscosity=1.01 (100 ml./g., benzene 30° C.)
Average particle size=0.4μ
$T_{135} = -2°$ C.
$T_4 = +5°$ C.

EXAMPLE 7

A paint was prepared by adding the following materials in the quantities indicated to the latex of Example 6:

| | Parts |
|---|---:|
| Cellosize QP-4400, 3% solution (Hydroxy ethyl cellulose) _____ | 200 |
| Nopco NDW (Defoamer) _____ | 2 |
| Tamoil 731 (Sodium salt of carboxylated anionic surface-active agent) _____ | 5 |
| Igepal CO-610 (Nonyl phenoxy polyoxyethylene ethanol) _____ | 3 |
| Ethylene glycol _____ | 18 |
| Ti-Pure R-610 (Titanium dioxide) _____ | 150 |
| Lorite (Calcium carbonate/silicate) _____ | 240 |
| Phenyl mercuric acetate (18% Hg content) _____ | .3 |
| Carbitol acetate (Diethylene glycol monoethyl ether acetate) _____ | 10 |
| Water _____ | 292 |
| Latex (Example 6) _____ | 182 |

This paint is characterized by excellent scrubability and hiding power.

Touchup qualities were determined by making large area brushouts of tinted samples of the test paint over both previously painted and new gypsum board. At periods of 1 hour, 1 day and 3 days small areas were repainted, and when dry rated for lack of color uniformity, sheen uniformity or any other visual defect which would render the touched up area more apparent than the surrounding area.

Washability tests were conducted in accordance with Federal Test Method Standard No. 141, method 6142, except that the drying time was shortened to 48 hours at 72° F. ±2°, with no bake cycle at the end. Wet abrasion resistance was also checked in the same manner, by using a 50% slurry of Ajax cleanser in water to replace the 0.5% Ivory solution.

To determine low temperature fusion properties, a .003 mil Bird applicator, a Morest chart form HC (glued to a glass panel for rigidity), and the test paint tinted medium blue are preconditioned for one hour in a special cooler set at 40° F. ±1°. The paint is then drawn down and allowed to dry for 18 hours at this temperature, after which it is visually rated for color uniformity.

It will be apparent that various changes and modifications may be made in the embodiments of the invention described above, without departing from the scope of the invention, as defined in the appended claim, and it is intended, therefore, that all matter contained in the foregoing description shall be interpreted as illustrative only and not as limitative of the invention.

We claim:
1. An aqueous paint composition for application to a supporting wooden or gypsum board surface comprising a synthetic polymer latex, a pigment, and, based on the weight of the paint, 0.1–3 percent cellulosic thickener selected from the group consisting of methyl cellulose, hydroxyethyl cellulose and carboxymethyl cellulose, said synthetic polymer latex comprising an aqueous medium having dispersed therein a vinyl acetate-ethylene copolymer containing 5 to 40% ethylene in the copolymer, said copolymer being further characterized by an intrinsic viscosity of 1 to 2.5 deciliters per gram as measured in benzene at 30° C., and said dispersed copolymer having a particle size of 0.1μ to 2μ, said paint having a solids content of 45 to 60 percent by weight and said pigment being present in an amount of 10 to 1,000 parts by weight per 100 parts by weight of said vinyl acetate-ethylene latex solids.

References Cited

UNITED STATES PATENTS

| | | |
|---|---|---|
| 3,337,482 | 8/1967 | Watanabe et al. |
| 3,296,170 | 1/1967 | Burkhart et al. |

FOREIGN PATENTS

| | | |
|---|---|---|
| 1,127,085 | 4/1962 | Germany. |
| 582,093 | 1/1946 | Great Britain. |

LUCILLE M. PHYNES, Primary Examiner

U.S. Cl. X.R.

117—148, 161 C; 260—17.4 ST, 29.6 R, MP, 29.6 MQ, ME, 42.55, 87.3